(12) United States Patent
Teshima et al.

(10) Patent No.: US 8,908,274 B2
(45) Date of Patent: Dec. 9, 2014

(54) MICROSTRUCTURE MANUFACTURING METHOD AND MICROSTRUCTURE

(75) Inventors: Takayuki Teshima, Yokohama (JP); Shinan Wang, Kashiwa (JP); Yutaka Setomoto, Tokyo (JP); Takashi Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 13/023,454

(22) Filed: Feb. 8, 2011

(65) Prior Publication Data

US 2011/0194673 A1  Aug. 11, 2011

(30) Foreign Application Priority Data

Feb. 10, 2010 (JP) .................... 2010-028177

(51) Int. Cl.
| | | |
|---|---|---|
| *G02B 5/18* | (2006.01) | |
| *C23C 18/16* | (2006.01) | |
| *C23C 18/18* | (2006.01) | |
| *C25D 5/10* | (2006.01) | |
| *C25D 5/12* | (2006.01) | |
| *C25D 5/50* | (2006.01) | |
| *G21K 1/06* | (2006.01) | |
| *C25D 7/12* | (2006.01) | |
| *C25D 5/02* | (2006.01) | |

(52) U.S. Cl.
CPC ............. *G21K 1/06* (2013.01); *C23C 18/1692* (2013.01); *C23C 18/1651* (2013.01); *C23C 18/1868* (2013.01); *G02B 5/1838* (2013.01); *C25D 5/10* (2013.01); *C25D 5/12* (2013.01); *C25D 5/50* (2013.01); *C23C 18/1653* (2013.01); *G21K 2207/005* (2013.01); *C25D 7/123* (2013.01); *G02B 5/1866* (2013.01); *G02B 5/1857* (2013.01); *C23C 18/1851* (2013.01); *C25D 5/02* (2013.01); *C25D 5/022* (2013.01); *C23C 18/1612* (2013.01)
USPC .............. 359/570; 359/576; 359/563; 378/62; 378/71; 378/85

(58) Field of Classification Search
USPC ...................................... 359/570; 378/62, 145
See application file for complete search history.

(56) References Cited

U.S. PATENT DOCUMENTS

| | | | |
|---|---|---|---|
| 5,908,719 A * | 6/1999 | Guckel et al. ...................... 430/5 |
| 2007/0183579 A1* | 8/2007 | Baumann et al. ............. 378/145 |
| 2007/0183583 A1* | 8/2007 | Baumann et al. ............. 378/145 |
| 2007/0183584 A1* | 8/2007 | Baumann et al. ............. 378/145 |
| 2010/0246769 A1* | 9/2010 | David et al. ...................... 378/84 |

OTHER PUBLICATIONS

Fabrication of diffraction gratings for hard X-ray phase contrast imaging, by C. David, T. Rohbeck, C. Grunzweig, C. Kottler, A. Diaz, O. Bunk, and F. Pfeiffer, "Microelectronic Engineering" vol. 84, pp. 1172-1177 (2007).

* cited by examiner

*Primary Examiner* — Alicia M Harrington
*Assistant Examiner* — Marin Pichler
(74) *Attorney, Agent, or Firm* — Canon U.S.A., Inc. IP Division

(57) ABSTRACT

A microstructure manufacturing method includes: preparing a mold having on a front side thereof a plurality of fine structures, with conductivity being imparted to a bottom portion between the plurality of fine structures; forming a first plating layer between the plurality of fine structures by plating the bottom portion; and forming a second plating layer of larger stress than the first plating layer on the first plating layer between the plurality of fine structures, wherein the stress of the second plating layer is used to curve a back side surface of the mold.

15 Claims, 6 Drawing Sheets

MICROSTRUCTURE MANUFACTURING METHOD AND MICROSTRUCTURE

BACKGROUND OF THE INVENTION

1. Field of the Invention

The present invention relates to a microstructure manufacturing method and a microstructure, and, in particular, to a method of manufacturing an absorption grating of an X-ray imaging apparatus and an absorption grating.

2. Description of the Related Art

A diffraction grating consisting of a microstructure having a periodic structure is utilized in various apparatuses as a spectral element. A microstructure formed of gold utilizing the absorption characteristics of an X-ray is used in a nondestructive test of an object as an industrial application and in radiography as a medical application. In these uses, a contrast image is formed by utilizing a difference in absorption at the time of X-ray transmission due to the constituent elements and a difference in density in an object or a biological object, and this technique is referred to as an X-ray absorption contrast method.

Also in the Talbot interferometry, which is one of the phase contrast methods using a phase difference in an X-ray, there is used an absorption grating formed of gold, which has a periodic structure of large X-ray absorption. As a method of preparing an absorption grating formed of gold having periodic structure, a method in which a mold is filled with gold by plating is preferable.

The literature: "Microelectronic Engineering" Vol. 84, 1172 (2007), discusses a method using a one-dimensional mold formed through anisotropic wet etching of silicon. According to this method, an aluminum layer is formed on an apex portion of a one-dimensional mold by oblique deposition. Subsequently, gold is deposited on the bottom portion of the one-dimensional mold and on the aluminum layer by a deposition method with directivity. Then, the gold on the aluminum layer is also removed at the time of removal of the aluminum layer through etching, and, thereafter, an absorption grating formed of a gold-cobalt alloy is prepared using a cyan-type gold-cobalt plating solution.

In the above literature, the absorption grating is flat, so that it is effective in treating parallel rays, for example, in the case of a radiation facility. However, in an imaging in a laboratory using an X-ray source in the form of a point light source of an X-ray tube, the advancing direction of the X-ray and the depth direction of the grating are deviated from each other near the periphery of the X-ray absorption grating. Furthermore, if a protrusion forming the absorption grating is not situated at one point where the light is condensed, an X-ray to be transmitted through the absorption grating can instead be shielded.

SUMMARY OF THE INVENTION

The present invention is directed to a method of manufacturing a curved microstructure.

According to an aspect of the present invention, a microstructure manufacturing method includes the steps of: preparing a mold having on a front side thereof a plurality of fine structures, with conductivity being imparted to a bottom portion between the plurality of fine structures; forming a first plating layer between the plurality of fine structures by plating the bottom portion; and forming a second plating layer of larger stress than the first plating layer on the first plating layer between the plurality of fine structures, wherein the stress of the second plating layer is used to curve a back side surface of the mold.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to disclose the present invention.

DESCRIPTION OF THE EMBODIMENTS

Various exemplary embodiments, features, and aspects of the invention will be described in detail below with reference to the drawings.

FIGS. 1A through 1F are process diagrams schematically illustrating an easily curved microstructure manufacturing method according to an exemplary embodiment.

Figure 1A:
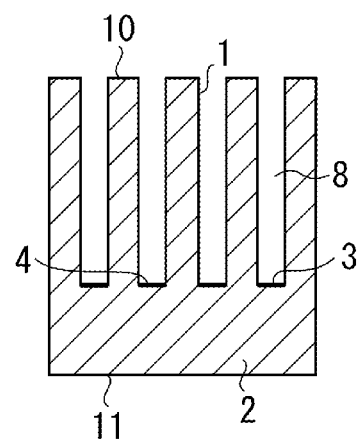
FIGS. 1A through 1F are diagrams illustrating the steps of a microstructure manufacturing method.
Figure 2A:
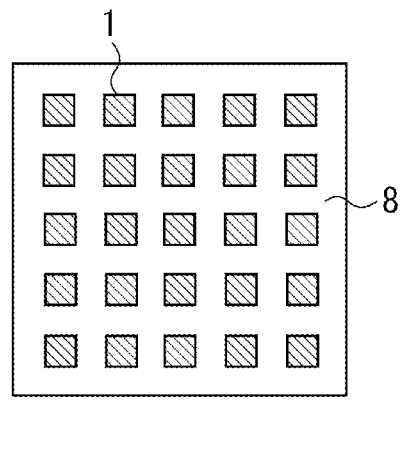
FIGS. 2A through 2E are diagrams illustrating plating layers.

A microstructure manufacturing method according to the present exemplary embodiment is a method of manufacturing a microstructure comprising a mold 2 having fine structures and a plating layer on a front side 10 and a curved surface on a back side 11. First, as shown in FIG. 1A, there is prepared the mold 2 which has fine structures 1 formed by etching in a depth direction by anisotropic etching and in which a conductive layer 4 is provided on a bottom portion 3 of a continuous gap 8 between the fine structures 1 to impart conductivity thereto. FIG. 2A is a plan view illustrating how the fine structures 1 are formed on the mold 2. The fine structures 1 are formed as a pattern through patterning, with the continuous gap 8 formed around the fine structures 1.

As the anisotropic etching method, it is possible to adopt X-ray lithography using polymethyl methacrylate (PMMA). Here, the anisotropic etching also includes the idea of performing a patterning of high sectional verticality in development using a photo resist. More specifically, it is possible to use an ultraviolet-exposure thick film photo resist with a substantially vertical sectional profile like SU-8 manufactured by Kayaku MacroChem Co., Ltd.

It is also possible to adopt ion coupling plasma-reactive ion etching (ICP-RIE) which can perform high sectional vertical etching. Further, using single crystal silicon and a strong alkali aqueous solution such as potassium hydroxide aqueous solution, it is possible to adopt an anisotropic etching utilizing a silicon crystal orientation surface.

As a method of imparting conductivity to the bottom portion 3 of the gap 8 between the fine structures, it is possible to form a metal film or the like by a dry process such as electron beam evaporation, vacuum sputtering, or chemical deposition process, or a wet process by electroless plating, selectively forming a conductive layer 4 by semiconductor photolithography. It is also possible to impart conductivity by bonding to each other silicon wafer surfaces each coated with a gold film, and by performing silicon anisotropic etching until a gold seed electrode is exposed from one surface. Further, it is also possible to impart conductivity by applying the above-mentioned SU-8 to the substrate on which an electrode has been formed and exposing the electrode layer through photolithography.

Figure 1B:
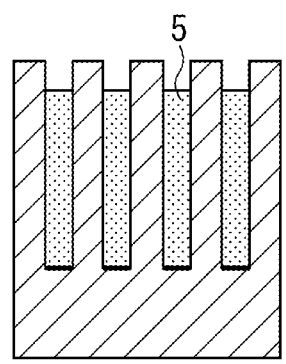
Figure 2B:
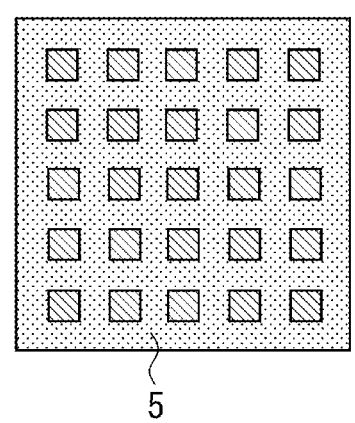

Next, as shown in FIG. 1B, plating is performed from the conductive portion at the bottom portion 3 of the fine structures to form a first plating layer 5 in the continuous gap 8 between the fine structures. FIG. 2B is a plan view showing how the first plating layer 5 is formed in the continuous gap 8 between the fine structures 1.

As the method of forming the first plating layer 5, it is possible to adopt electroplating or electroless plating. Examples of the material of the first plating layer 5 include noble metals such as gold, silver, platinum, rhodium, and palladium; it is also possible to use other metals such as copper, nickel, chromium, tin, iron, cobalt, zinc, and bismuth and an alloy of these metals.

Figure 1C:
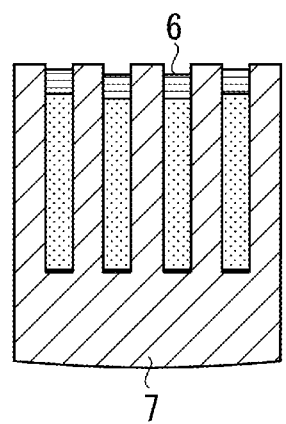
Figure 2C:
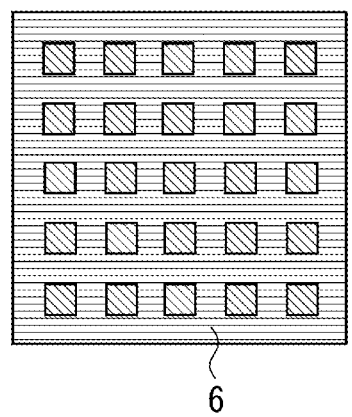

Next, as shown in FIG. 1C, a second plating layer 6 which generates stress is formed on the first plating layer 5, and the mold 2 is curved by the stress of the second plating layer 6. FIG. 2C is a plan view showing the second plating layer 6 formed on the first plating layer 5.

The second plating layer 6 can also be formed by such method as electroplating or electroless plating. Examples of the material of the second plating layer 6 include noble metals such as gold, silver, platinum, rhodium, and palladium; it is also possible to use other metals such as copper, nickel, chromium, tin, iron, cobalt, and zinc, and an alloy of these metals.

Figure 2D:
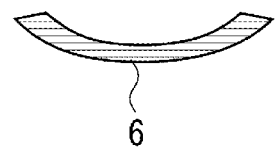

When, as shown in FIG. 2D, the plating layer formation surface is to be curved in a concave fashion, a plating metal material which generates tensile stress is used. In general, as a plating material easily allowing generation of tensile stress, a metal material of a relatively high melting point is used, examples of which include nickel, cobalt, iron, palladium, chromium, and copper.

Figure 2E:
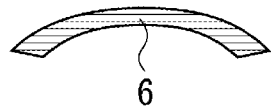

When, as shown in FIG. 2E, the plating layer formation surface is to be curved in a convex fashion, a plating metal material generating compressive stress is used. Examples of a plating metal material easily allowing generation of compressive stress include metal materials of a relatively low melting point such as zinc, tin, and bismuth.

It is also possible to add an additive comprising an organic material to the plating solution to control the tensile stress and compressive stress. It is desirable for the second plating layer to be within the groove between the fine structures. It is not necessary for the second plating layer 6 to be formed on all of the first plating layer; the region where the second plating layer 6 is to be formed may be determined according to a desired curvature. In this case, before forming the second plating layer, an insulating mask layer is formed on the region of the first plating layer where the second plating layer 6 is not to be formed. To form the mask layer, it is possible to adopt semiconductor photolithography using photo resist, or mask deposition in which a metal mask is used and in which an insulating mask is formed solely in a desired region.

The present exemplary embodiment is characterized by the use of silicon as the mold material. Since silicon allows formation of a mold of high aspect, it is possible to produce a microstructure curved in high aspect.

Silicon allows formation of a fine structure of high aspect through ion coupling plasma-reactive ion etching (ICP-RIE), which allows etching of high verticality. Further, using single crystal silicon and a strong alkali aqueous solution such as potassium hydroxide aqueous solution, it is possible to adopt an anisotropic etching, which utilizes a silicon crystal orientation surface to form the fine structures. Since silicon is in itself a material having resistance to plating solution, it is possible to widen the range of selection for the plating metal materials used for the first plating layer 5 and the second plating layer 6.

Figure 1D:
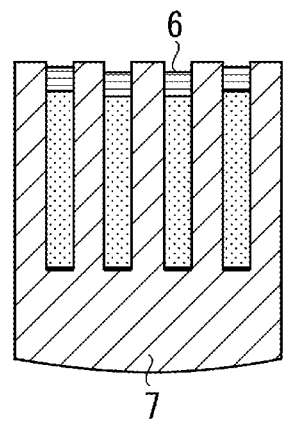

As shown in FIG. 1D, in the present exemplary embodiment, heating is provided after the formation of the second plating layer, thereby increasing the stress of the second plating layer. This enables the mold 2 to curve more greatly without increasing the thickness of the second plating layer 6. In particular, in a case where the gap 8 between the fine structures 1 is small, if the thickness of the second plating layer 6 is increased, the second plating layer 6 will get beyond the gap 8 as shown in FIG. 1F; thus, when such a condition is not desirable, this proves effective. For example, in the case where the microstructure of the present exemplary embodiment is used as an X-ray absorption grating, the contrast of X-ray absorption between the plating layer in the groove and the mold is reduced.

Figure 1E:
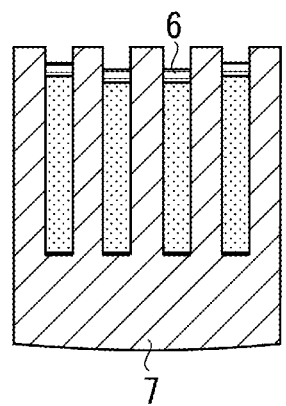
Figure 1F:
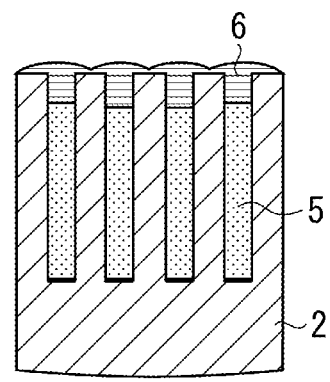

In the present exemplary embodiment, after the above-mentioned heating as shown in FIG. 1E, etching is performed on a part of the second plating layer 6. Through the etching of a part of the second plating layer 6, the stress applied to the mold 2 from the second plating layer 6 is mitigated, reducing the degree of the curving. Furthermore, it is possible to adjust the curvature of the mold 2 to a more desired one. More specifically, through the heating, curving is effected to a greater degree than a desired curvature, and a part of the plating layer 6 is gradually etched, whereby it is possible to curve the mold 2 at a desired curvature with high precision.

In the present exemplary embodiment, after the above-mentioned heating, etching is performed on a part of the back side of the surface of the mold 2 on which the second plating layer 6 is formed. Since the mold 2 is reduced in thickness through the etching, the mold 2 is further curved by the stress of the second plating layer 6. As an etching method both isotropic and anisotropic etching may be adopted; it is also possible to adopt polishing. Further, it is possible to perform etching solely on a partial region through semiconductor photolithography. Through the etching, it is possible to mitigate the curving of the microstructure greatly curved, so that it is possible to manufacture a microstructure which allows adjustment to a desired curvature. Further, it is also possible to mitigate the degree of curving, enabling manufacture of a microstructure reduced in thickness. In the case where silicon is used for the mold, it is possible to reduce the X-ray absorption of the silicon itself, so that it is possible to produce an absorption grating of high X-ray absorption contrast.

Further, the manufacturing method of the present exemplary embodiment is applicable not only to an absorption grating for use in a Talbot X-ray interferometer, but also to other optical elements. A microstructure 7 formed by the microstructure manufacturing method of the present exemplary embodiment is used as a radiation absorption grating. By using gold, which greatly absorbs X-ray, as the material of the first plating layer of the microstructure 7 of the present exemplary embodiment, and using silicon or the like, which absorbs X-ray relatively in small measure, as the mold material, it is possible to produce a gold radiation absorption grating of high aspect ratio. Further, since the microstructure 7 formed by the manufacturing method of the present exemplary embodiment can be curved, it is possible to provide a radiation absorption grating which allows an imaging improved in terms of spatial coherence even in the case of an X-ray source in the form of a point light source.

The first exemplary embodiment will be described with reference to FIGS. 3A through 3E. In the present exemplary embodiment, the mold 2, in which conductivity is imparted to the bottom portion of the gap between the fine structures formed through etching in the depth direction by anisotropic etching, is prepared as follows.

There is prepared a silicon wafer whose surfaces are both formed as mirror surfaces and which has a size of 101.6 mm (4 inches) and a thickness of 300 μm, and a chromium layer is formed on solely one surface thereof with a thickness of 2000 Å (200 nm) by an electron beam evaporation apparatus. A positive type resist is applied to the surface of the layer, and patterning is effected by semiconductor photolithography such that resist patterns of 4 μm square are arranged two-dimensionally at intervals of 8 μm. After that, etching is performed on the chromium in a chromium etching aqueous solution to expose the silicon, whereby a silicon exposure surface is formed around the resist pattern in which the patterns of 4 μm square are arranged two-dimensionally at intervals of 8 μm.

Figure 3A:
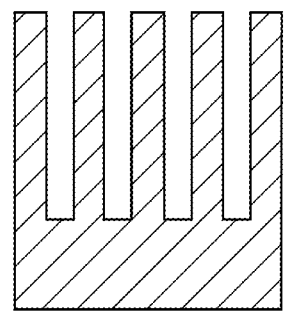
FIGS. 3A through 3E are diagrams illustrating the steps of a microstructure manufacturing method.

Subsequently, deep anisotropic etching is performed on the exposed silicon by ICP-RIE. The deep etching is stopped when the etching progresses to a depth of 70 μm. As a result, a two-dimensional silicon grating having a height of 50 μm is formed (FIG. 3A).

Figure 3B:
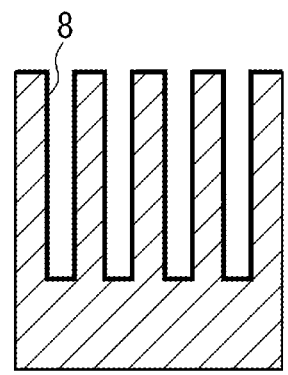
Figure 3C:
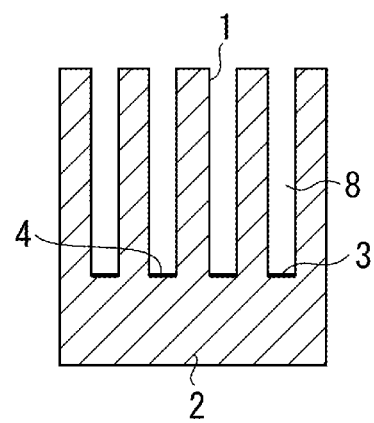

Subsequently, the resist and the chromium are removed by ultraviolet (UV) ozone asking in a chromium etching aqueous solution. Next, the grating is put in a thermal oxidation furnace to form a thermally oxidized film 9 of 1500 Å (150 nm) on the surface thereof (FIG. 3B). Then, layers of chromium and gold are formed in this order by an electron beam evaporation apparatus respectively with a thickness of 75 Å (7.5 nm) and a thickness of 550 Å (55 nm). As a result, as shown in FIG. 3C, conductivity is imparted to the bottom portion of the gap between the fine structures 1, and the product thus obtained is used as the mold 2 of the present exemplary embodiment. The radius of curvature of the mold 2 as measured by a membrane stress meter (Tencor FLX-2320) is 34.8 m.

Figure 3D:
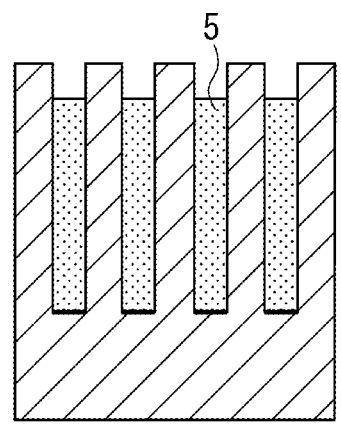

The first plating layer is formed throughout the portion of the mold 2 to which conductivity has been imparted (FIG. 3D). In forming the first plating layer, plating is performed for 8 hours in a non-cyanide gold plating solution (Microfab Au1101 manufactured by Nippon Electroplating Engineers) at a plating solution temperature of 60° C. and an electric current density of 0.2 A/dm². As a result, the first plating layer, which comprises a gold layer having a thickness of 50 μm is formed.

Figure 3E:
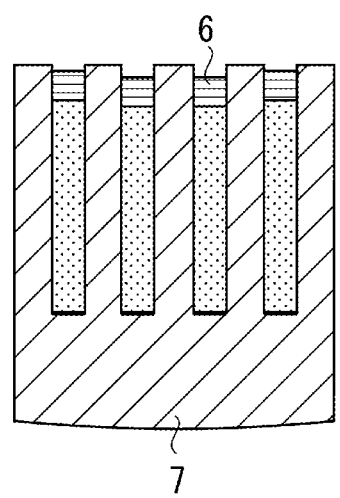

Subsequently, the second plating layer is formed on the first plating layer (FIG. 3E). In forming the second plating layer, as the plating solution, a nickel sulfamate plating solution is used with 0.2 g/L of 2-butyne-1,4-diol added thereto. Plating is performed for 30 minutes at a plating solution temperature of 50° C. and an electric current density of 1.5 A/dm². As a result, the second plating layer, which comprises a nickel layer having a thickness of 8 μm is formed. The radius of curvature of this mold as measured by a thin film stress meter (Tencor FLX-2320) is 5.8 m; thus, a curved microstructure is obtained. Observation of this microstructure from the plating layer thickness direction by an X-ray microscope showed that the silicon portion allows transmission of X-rays, whereas the plating layer portion absorbs X-rays, thus indicating a great contrast.

In a comparative example, a process is performed same as the first exemplary embodiment up to the formation of the first plating layer. After that, layers of chromium and gold are formed in this order by sputtering deposition respectively with a thickness of 100 Å (10 nm) and a thickness of 3000 Å (300 nm) from the top of the first plating layer to the top of the silicon fine structures, thereby forming a conductive layer. A nickel plating layer is formed through this conductive layer. A nickel sulfamate plating solution with 0.2 g/L of 2-butyne-1, 4-diol added thereto is used as the plating solution. Plating is performed for 30 minutes at a plating solution temperature of 50° C. and an electric current density of 1.5 A/dm². As a result, the second plating layer, which comprises a nickel layer having a thickness of 8 μm is formed.

The radius of curvature of this mold is 4.0 m as measured by a thin film stress meter (Tencor FLX-2320); thus, a curved microstructure is obtained. Observation of this microstructure from the plating layer thickness direction shows that the contrast of X-ray absorption is reduced as compared with that in the first exemplary embodiment due to the formation of the nickel plating layer also on the silicon portion.

In a second exemplary embodiment, the same curved microstructure as that obtained in the first exemplary embodiment is used. A microstructure curved to a radius of curvature of 5.8 m is placed on a hot plate set to a temperature of 200° C. and heating is effected for 2 hours; thereafter, the microstructure is cooled to room temperature over a period of 1 hour. The nickel of the second plating layer is increased in tensile stress through the heating. The radius of curvature of this mold as measured by a thin film stress meter (Tencor FLX-2320) is 4.0 m; thus, a greatly curved microstructure is obtained.

In a third exemplary embodiment, the curved microstructure as obtained in the second exemplary embodiment is used. The microstructure curved to a radius of 4.0 m is immersed in an aqueous solution of ammonium per sulfate and nitric acid, and etching of 2.6 μm is performed on the nickel of the second plating layer. As a result, the stress on the mold 2 generated from the second plating layer is mitigated. The radius of curvature of this mold as measured is 5.2 m. Further, etching of 1.4 μm is performed on the nickel of the second plating layer, which further mitigates the stress, resulting in a radius of curvature of 7.5 m.

Ina fourth exemplary embodiment, the mold 2, in which conductivity is imparted to the bottom portion of the gap between the fine structures 1 formed through anisotropic etching in the depth direction, is prepared as follows. Two silicon wafers having a size of 101.6 mm (4 inches) and a thickness of 300 μm are prepared, and layers of titanium and gold are formed in this order on each of them by an electron beam evaporation apparatus respectively with a thickness of 50 Å (55 nm) and a thickness of 1000 Å (100 nm). The gold layers of the formed layers are bonded to each other using a bonding apparatus to prepare a bonded substrate. On one surface of the bonded substrate, as a protective mask layer, layers of titanium and gold are formed in this order by an electron beam evaporation apparatus respectively with a thickness of 50 Å (5 nm) and a thickness of 5000 Å (500 nm). Etching is performed with a thickness of 150 μm on the surface where no protective mask layer is formed, using an aqueous solution of potassium hydroxide.

A chromium layer is formed on the etched surface with a thickness of 2000 Å (200 nm) by an electron beam evaporation apparatus. A positive type resist is applied to the surface of the layer, and pattering is effected by semiconductor photolithography such that resist patterns of 4 μm square are arranged two-dimensionally at intervals of 8 μm. After that, etching is performed on the chromium in a chromium etching aqueous solution to expose the silicon, whereby a silicon exposure surface is formed around the resist pattern in which the patterns of 4 μm square are arranged two-dimensionally at intervals of 8 μm. Subsequently, deep anisotropic etching is performed on the exposed silicon by ICP-RIE. The gold is exposed when deep etching has been effected to a depth of 150 μm, and, at this point in time, the deep etching is stopped. As a result, a two-dimensional silicon grating having a height of 150 μm is formed. Subsequently, the resist and the chromium are removed by ultraviolet (UV) ozone asking in a chromium etching aqueous solution, and the substrate thus obtained is used as the mold 2 of the present exemplary embodiment. The radius of curvature of the mold 2 as measured by a membrane stress meter (Tencor FLX-2320) is 40.8 m.

The first plating layer is formed with the gold exposed through the deep etching. In forming the first plating layer, plating is performed for 8 hours in a gold cyanide plating solution (Galvanomeister GB3 manufactured by Nippon Electroplating Engineers) at a plating solution temperature of 50° C. and an electric current density of 0.2 A/dm$^2$. As a result, the first plating layer, which comprises a gold layer having a thickness of 50 μm is formed.

Subsequently, the second plating layer is formed on the first plating layer. In forming the second plating layer, a copper sulfate plating solution is used as the plating solution. Plating is performed for 30 minutes at an electric current density of 2 A/dm$^2$. As a result, the second plating layer, which comprises a copper layer having a thickness of 10 μm is formed. The radius of curvature of this mold as measured by a thin film stress meter (Tencor FLX-2320) is 8.9 m; thus, a curved microstructure is obtained.

Subsequently, etching of 200 μm is performed on the back side of the surface where the second plating layer is formed, using sulfur hexafluoride and polishing is performed to attain a mirror surface. As a result, the mold 2 is reduced in thickness, and is further curved by the plating stress. The radius of curvature of this mold as measured by a thin film stress meter (Tencor FLX-2320) is 4.7 m.

Figure 4:
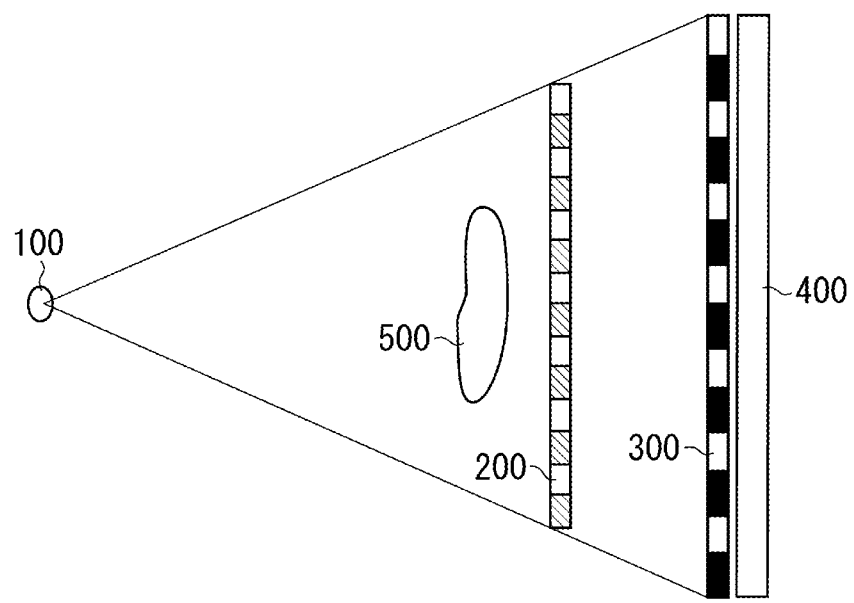
FIG. 4 is a diagram illustrating an X-ray imaging apparatus.

Next, an imaging apparatus employing the X-ray Talbot interferometry will be described with reference to FIG. 4. FIG. 4 is a schematic diagram illustrating an imaging apparatus using, as the absorption grating, a microstructure produced by a method according to one of the exemplary embodiments described above. The imaging apparatus of the present exemplary embodiment is configured with an X-ray source 100 emitting spatially coherent divergent X-rays, a diffraction grating 200 for periodically modulating the phase of the X-rays, an absorption grating 300 in which X-ray absorbing portions (shielding portions) and X-ray transmitting portions are arranged, and a detector 400 detecting X-rays. The absorption grating 300 comprises a microstructure as produced by a method according to one of the exemplary embodiments described above. When a specimen 500 is arranged between the X-ray source 100 and the diffraction grating 200 (or between the diffraction grating 200 and the absorption grating 300), information on X-ray phase shift due to the specimen 500 is detected by the detector 400 as a moiré. Specifically, this imaging apparatus images the specimen 500 by imaging the moiré having the phase information on the specimen 500. When a phase recovery processing such as Fourier transformation is performed based on this detection result, it is possible to obtain a phase image of the specimen. In the imaging apparatus of the present exemplary embodiment, the absorption grating 300 capable of efficiently using the divergent X-rays from the X-ray source 100 is used, so that it is possible to shorten the imaging time for the specimen 500.

While the present invention has been described with reference to exemplary embodiments, it is to be understood that the invention is not limited to the disclosed exemplary embodiments. The scope of the following claims is to be accorded the broadest interpretation so as to encompass, for example, all modifications, equivalent structures, and functions.

This application claims priority from Japanese Patent Application No. 2010-028177 filed Feb. 10, 2010, which is hereby incorporated by reference herein in its entirety.

What is claimed is:

1. A microstructure comprising:
   a mold having a plurality of fine structures;
   a first plating layer provided in a gap between the plurality of fine structures; and
   a second plating layer provided on the first plating layer and provided in the gap,
   wherein the second plating layer has a larger membrane stress than the first plating layer, and contacts the first plating layer.

2. A microstructure according to claim 1, wherein the mold is formed of silicon.

3. A microstructure according to claim 1, wherein the mold is formed of silicon, and
   wherein the first plating layer is formed of gold.

4. A microstructure according to claim 1, wherein the mold is formed of silicon,
   wherein the first plating layer is formed of gold, and
   wherein the second plating layer is formed of nickel.

5. An X-ray imaging apparatus comprising:
   a diffraction grating configured to diffract X-rays from an X-ray source;
   an absorption grating configured to shield a part of the X-rays diffracted by the diffraction grating; and
   a detector configured to detect the X-rays from the absorption grating,
   wherein the absorption grating is the microstructure according to claim 1.

6. A microstructure according to claim 1, wherein the second plating layer is thinner than the first plating layer.

7. A microstructure according to claim 1, wherein an aspect ratio of each of the plurality of fine structures is 17.5 or over.

8. A microstructure according to claim 1, wherein a material of the first plating layer and a material of the second plating layer are different from each other.

9. A microstructure according to claim 1, wherein the mold is curved by the membrane stress of the second plating layer.

10. A microstructure according to claim 1, wherein the mold is curved in a concave fashion, and
    wherein the membrane stress of the second plating layer is tensile stress.

11. A microstructure manufacturing method comprising:
    preparing a mold having a plurality of fine structures on a front side thereof, with conductivity being imparted to a bottom portion between the plurality of fine structures;
    forming a first plating layer between the plurality of fine structures by plating the bottom portion; and
    forming a second plating layer of larger stress than the first plating layer on the first plating layer between the plurality of fine structures, wherein the stress of the second plating layer is used to curve a back side surface of the mold,
    wherein the microstructure is the microstructure according to claim 1.

12. The microstructure manufacturing method according to claim 11, wherein the curving includes increasing the stress of the second plating layer by heating the second plating layer.

13. The microstructure manufacturing method according to claim 11, further comprising etching a part of the second plating layer.

14. The microstructure manufacturing method according to claim 11, further comprising etching a part of the back side surface of the mold.

15. The microstructure manufacturing method according to claim 11, wherein the preparing the mold comprises:
  forming the plurality of fine structures on a substrate through etching; and
  imparting conductivity to the bottom portion between the plurality of fine structures.

\* \* \* \* \*